(12) United States Patent
Luehr et al.

(10) Patent No.: US 7,347,476 B2
(45) Date of Patent: Mar. 25, 2008

(54) RAMP DOOR AND FRAME ASSEMBLY

(75) Inventors: Richard E. Luehr, Kelowna (CA); Ron W. Phillips, Sandy, OR (US); Peter T. Watson, Kelowna (CA)

(73) Assignee: The Eastern Company, Naugatuck, CT (US)

( * ) Notice: Subject to any disclaimer, the term of this patent is extended or adjusted under 35 U.S.C. 154(b) by 284 days.

(21) Appl. No.: 11/247,777

(22) Filed: Oct. 11, 2005

(65) Prior Publication Data

US 2006/0220410 A1    Oct. 5, 2006

Related U.S. Application Data

(60) Provisional application No. 60/666,793, filed on Mar. 31, 2005.

(51) Int. Cl.
*B62D 33/03* (2006.01)

(52) U.S. Cl. .................. 296/61; 296/57.1; 296/146.8; 296/146.9

(58) Field of Classification Search .................. 296/50, 296/57.1, 61, 186.4, 146.8, 146.9
See application file for complete search history.

(56) References Cited

U.S. PATENT DOCUMENTS

| | | |
|---|---|---|
| 2,184,814 A | 12/1939 | Naganatsu |
| 2,328,082 A | 8/1943 | Lawrence |
| 2,541,288 A | 2/1951 | Rice |
| 2,605,494 A | 8/1952 | Lyons, Jr. et al. |
| 2,653,845 A | 9/1953 | Benjamin |
| 2,847,136 A | 8/1958 | Neff |
| 3,009,732 A | 11/1961 | Brown |
| 3,104,910 A | 9/1963 | Kappen |
| 3,179,462 A | 4/1965 | Hagen |
| 3,193,321 A | 7/1965 | Rose |
| 3,303,613 A | 2/1967 | Seuntjens |
| 3,845,980 A | 11/1974 | Grabast |
| 3,902,613 A | 9/1975 | Newland |
| 3,961,716 A | 6/1976 | Renaud |
| 4,037,564 A * | 7/1977 | Schrock ........................ 296/61 |
| 4,312,203 A | 1/1982 | Davis |
| 4,320,642 A | 3/1982 | Pastva, Jr. |

(Continued)

FOREIGN PATENT DOCUMENTS

GB        309464        4/1929

(Continued)

*Primary Examiner*—Christopher P. Ellis
*Assistant Examiner*—Greg Blankenship
(74) *Attorney, Agent, or Firm*—David A. Burge

(57) ABSTRACT

A ramp door suited to pivot about an axis that extends substantially horizontally along the bottom of a cargo compartment opening has features of lightweight construction that may be used separately or in combination with features of a frame assembly having an upright configured to extend substantially vertically along one side of the opening to provide an interior space that may be used to house components of a ramp door lift assist system and/or components of a ramp door latching system. In some embodiments, the extent to which a lift assist cable is exposed when the ramp door is open is minimized by connecting the cable to the ramp door, and by guiding the cable into the interior space of the upright, at locations relatively near to the pivot axis.

13 Claims, 16 Drawing Sheets

U.S. PATENT DOCUMENTS

| | | | |
|---|---|---|---|
| 4,457,146 A | 7/1984 | Weinerman | |
| 4,529,351 A * | 7/1985 | Olins | 414/545 |
| 4,601,485 A | 7/1986 | Furchak | |
| 4,703,961 A | 11/1987 | Weinerman et al. | |
| 4,854,631 A | 8/1989 | Laursen | |
| 4,869,545 A | 9/1989 | Notermann | |
| 4,887,393 A | 12/1989 | Cysewski | |
| 4,896,906 A | 1/1990 | Weinerman et al. | |
| 4,898,418 A | 2/1990 | Lind, Sr. et al. | |
| 4,917,412 A | 4/1990 | Swan et al. | |
| 5,069,491 A | 12/1991 | Weinerman et al. | |
| 5,117,665 A | 6/1992 | Swan et al. | |
| 5,171,048 A | 12/1992 | Weinerman et al. | |
| 5,192,096 A | 3/1993 | Weinerman et al. | |
| 5,314,200 A | 5/1994 | Phillips | |
| 5,439,260 A | 8/1995 | Weinerman et al. | |
| 5,480,729 A | 1/1996 | Hattori et al. | |
| D372,453 S | 8/1996 | Gold | |
| 5,564,295 A | 10/1996 | Weinerman et al. | |
| 5,586,458 A | 12/1996 | Weinerman et al. | |
| 5,595,076 A | 1/1997 | Weinerman et al. | |
| 5,611,224 A | 3/1997 | Weinerman et al. | |
| D388,884 S | 1/1998 | Karnoski | |
| 5,769,593 A * | 6/1998 | Buffaloe | 414/537 |
| 5,884,948 A | 3/1999 | Weinerman et al. | |
| 5,954,383 A | 9/1999 | Beck et al. | |
| D425,467 S | 5/2000 | Runfola | |
| 6,056,349 A | 5/2000 | Seksaria et al. | |
| 6,126,223 A * | 10/2000 | Rayburn | 296/57.1 |
| 6,132,836 A | 10/2000 | Quinif | |
| 6,135,532 A | 10/2000 | Martin | |
| 6,183,031 B1 | 2/2001 | Bailard et al. | |
| 6,196,609 B1 | 3/2001 | Bowers | |
| 6,196,617 B1 | 3/2001 | Beck | |
| D445,015 S | 7/2001 | Weinerman et al. | |
| D447,042 S | 8/2001 | Weinerman et al. | |
| 6,276,748 B1 | 8/2001 | Gobessi et al. | |
| 6,341,809 B1 | 1/2002 | Chapman | |
| 6,427,500 B1 | 8/2002 | Weinerman et al. | |
| D463,247 S | 9/2002 | Weinerman et al. | |
| 6,454,320 B1 | 9/2002 | Weinerman et al. | |
| D464,555 S | 10/2002 | Weinerman et al. | |
| 6,471,260 B1 | 10/2002 | Weinerman et al. | |
| D467,786 S | 12/2002 | Weinerman et al. | |
| 6,490,895 B1 | 12/2002 | Weinerman et al. | |
| 6,513,353 B1 | 2/2003 | Weinerman et al. | |
| D471,427 S | 3/2003 | Weinerman et al. | |
| D472,449 S | 4/2003 | Weinerman et al. | |
| 6,543,821 B1 | 4/2003 | Weinerman et al. | |
| 6,550,840 B2 * | 4/2003 | Rayburn | 296/57.1 |
| D474,098 S | 5/2003 | Weinerman et al. | |
| D474,673 S | 5/2003 | Weinerman et al. | |
| D474,727 S | 5/2003 | Scheffert | |
| D477,805 S | 7/2003 | LaBelle et al. | |
| 6,692,062 B1 | 2/2004 | Woodard | |
| 6,722,726 B1 | 4/2004 | Parmer | |
| D491,280 S | 6/2004 | Barnett | |
| 6,755,449 B2 | 6/2004 | Weinerman et al. | |
| 6,793,264 B1 * | 9/2004 | Muller et al. | 296/57.1 |
| 6,843,525 B2 | 1/2005 | Preisler | |
| 6,854,781 B2 | 2/2005 | Roach | |
| 6,899,362 B1 | 5/2005 | Weinerman et al. | |
| 7,029,050 B1 * | 4/2006 | Johnson et al. | 296/57.1 |
| 7,036,863 B2 * | 5/2006 | Hunter | 296/61 |
| 7,070,176 B1 * | 7/2006 | Rios | 267/179 |
| 7,080,866 B2 * | 7/2006 | Reisinger et al. | 296/24.4 |
| 7,287,803 B2 * | 10/2007 | Koneval et al. | 296/146.4 |

FOREIGN PATENT DOCUMENTS

| | | |
|---|---|---|
| GB | 510464 | 8/1939 |
| GB | 690940 | 4/1953 |
| NL | 7407939 | 12/1975 |

* cited by examiner

RAMP DOOR AND FRAME ASSEMBLY

CROSS-REFERENCE TO PROVISIONAL APPLICATION

This application claims the benefit of U.S. provisional application Ser. No. 60/666,793 filed March 31, 2005 by Richard E. Luehr et al (Atty's Docket No. 6-110), the disclosure of which is incorporated herein by reference.

BACKGROUND OF THE INVENTION

The present invention relates to ramp doors of the type that are pivoted along a bottom edge thereof for movement between an "up" or "closed" position wherein the ramp door closes at least a portion of an opening in an upstanding wall of a cargo compartment, and a "down" or "open" position wherein the ramp door may serve as a ramp to facilitate the movement of cargo, vehicles and/or personnel through the opening during loading and unloading of the cargo compartment.

Ramp doors typically have been large and heavy. A large size often is required, especially when a ramp door is used to close the rear of a vehicle's cargo compartment, because the width and height of the ramp door have needed to substantially equal the width and height of rear portions of the vehicle's cargo compartment. A heavyweight construction has commonly been employed to give the ramp door the capability, when serving as a ramp, to resist sagging or buckling under the weight of cargo, vehicles and/or personnel being moved into and out of the associated cargo compartment.

The heavier and more awkward a ramp door is to pivot between open and closed positions, the greater is the need for a lift system to assist with the door's pivotal movement. Although a variety of door closure assist systems employing cables, pulleys, springs and the like have been proposed, a problem commonly encountered with such systems when installed on sizable ramp doors has been the need for lengthy reaches of tensioned lift cable to be exposed to view and to unwanted contact when the ramp doors are open—lengthy exposed reaches of cable that bridge from cargo compartment walls or door frame uprights located on opposite sides of an opening (where lift assist components are housed in hollow interior portions of the walls or door frame uprights) to locations along opposite sides of a ramp door where the cables connect to the ramp door. The exposure of lengthy reaches of cable to undesired contact can result in damage and breakage not only to the cables and other closure assist system components but also to goods being loaded and unloaded through cargo compartment openings.

Although it is known to utilize cores of honeycomb material in the construction of lightweight doors for residential and commercial buildings, relatively lightweight doors of honeycomb core construction have not, until now, been found to serve acceptably as walk-on or drive-on ramps for the loading and unloading of small off-road recreational vehicles and other goods and cargo from the transport compartments of trucks, trailers and the like, especially where the cargo compartment openings to be closed by the doors are quite wide and tall, and especially wherein the doors, when open, are called on to provide relatively long walk-on or drive-on ramps.

Slam capable latches, also referred to as "slam latches," are well known for use with vehicle closures. Many slam latches designed for use on vehicles have rotary bolts that typically are retained in latched orientations by ratchet type pawls. Patents assigned to The Eastern Company that disclose a variety of rotary-bolt slam latches include U.S. Pat. Nos. 6,543,821, 6,513,353, 6,490,895, 6,471,260, 6,454,320, 6,427,500, 5,884,948, 5,611,224, 5,595,076, 5,586,458, 5,564,295, 5,439,260, 5,192,096, 5,171,048, 5,117,665, 5,069,491, 4,917,412, 4,896,906, 4,703,961, 4,457,146, 4,320,642 and 4,312,203, referred to hereinafter as the "Slam Latch Patents," the disclosures of which are incorporated herein by reference.

Push button actuator assemblies that are designed to move rigid links such as rods, or flexible links such as wire cables in response to depression of push button operators are well known for use in operating remotely located latches, including many of the slam latch assemblies disclosed in the referenced Slam Latch Patents. Among pending applications and issued patents assigned to The Eastern Company that disclose push button actuator assemblies designed to move rigid and flexible links such as rods and cables to operate latches in response to depression of push button operators are U.S. Pat. Nos. 6,899,362, 6,755,449, 6,543,821 and 6,454,320 and application Ser. No. 10/896,409, referred to hereinafter as the "Push Button Actuator Patents," the disclosures of which are incorporated herein by reference.

Design patents assigned to The Eastern Company that disclose appearance features of assemblies that may be used with push button actuators to cause operation of remotely located latch assemblies include Design Patents D-474,673, D-474,098, D-472,449, D-471,427, D-467,786, D-464,555, D-463,247, D-447,042 and D-445,015, referred to hereinafter as the "Push Button Actuator Design Patents," the disclosures of which are incorporated herein by reference.

SUMMARY OF THE INVENTION

The present invention relates to ramp door and ramp door frame improvement features, that may be used separately, or advantageously in combination to provide a relatively lightweight ramp door that is easy to raise and lower between open and closed positions, that minimizes lift cable exposure to unwanted contact, and/or that uses an interior space defined by at least one upright of a ramp door frame assembly to protectively enclose latch components and/or components that tension a lift cable to bias the ramp door closed.

In some embodiments, a relatively lightweight ramp door has a central region defined in large measure by a stiff, crush resistant honeycomb core sandwiched between a stiff inner sheet that provides the door with a surface that can be walked on, and a stiff outer sheet that defines an exterior face of the ramp door. Side members of the ramp door may connect overlying edge portions of the inner and outer sheets, may define peripheral portions of the ramp door that are thinner than the central region of the door, and may define mounting tracks to which lift cables and other components connect.

In some embodiments, a ramp door and frame assembly includes a frame assembly upright configured to extend substantially vertically along one side of a cargo compartment opening. The ramp door is pivotally connected to the upright for movement about an axis extending substantially horizontally along the bottom of the opening. An interior space defined by the upright may receive a portion of a lift cable connected to the ramp door, may house components of a mechanism that tensions the lift cable to bias the ramp door toward a closed position, and may house a latch mechanism in an upper region of the interior space that engages a ramp-door-carried strike to latch the ramp door closed. In some of these embodiments, the upright also may support a push button actuator that can be operated to release the latch mechanism's grasp of the strike, and/or the latch mechanism may include a release handle graspable from the interior of the associated cargo compartment to operate the latch mechanism.

In some embodiments, locations where a lift cable connects to a ramp door and enters the interior space of a door frame upright are selected to be relatively close to the pivot axis of the ramp door to minimize the length of a reach of the lift cable that is exposed outside the interior space of the upright when the ramp door is pivoted to an open position. Situating these locations at a common distance (measured from the pivot axis) that is within the range of about 11 percent to about 21 percent of the height of the ramp door (measured from the pivot axis when the ramp door is closed) is found to enable lift assist components housed within the interior of the upright to adequately tension the lift cable to bias the ramp door closed while also minimizing lift cable exposure when the ramp door is open.

BRIEF DESCRIPTION OF THE DRAWINGS

The foregoing and other features of the invention will be better understood from the description and claims that follow, taken together with the accompanying drawings, wherein:

DETAILED DESCRIPTION

Figure 1:
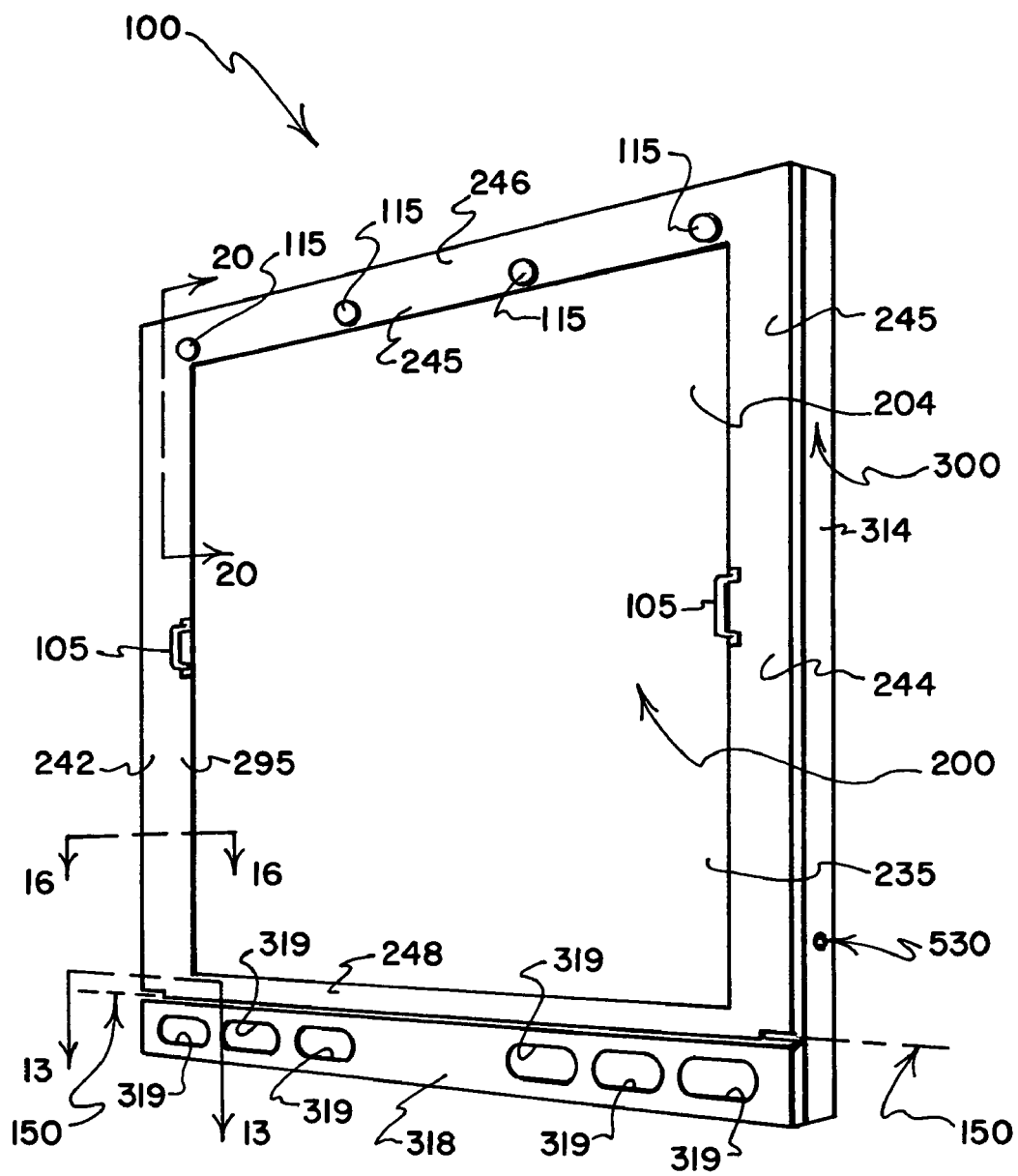
FIG. 1 is a perspective view showing a ramp door and frame assembly with the ramp door in an upright closed position.
Figure 2:
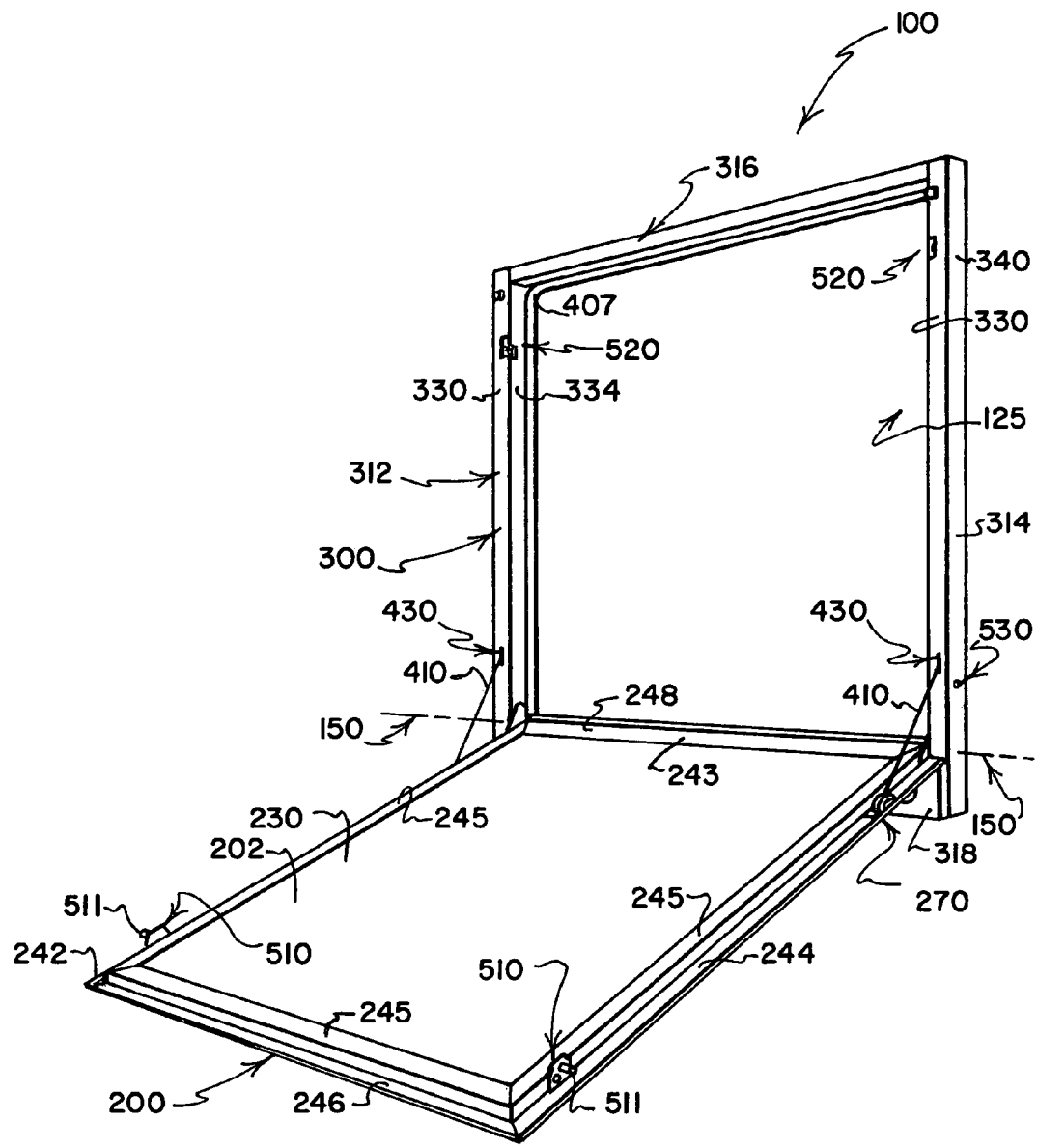
FIG. 2 is a perspective view showing the ramp door and frame assembly with the ramp door pivoted to an open position wherein the ramp door may serve as a ramp.

Referring to FIGS. 1 and 2, a combination ramp door and frame assembly is indicated generally by the numeral 100. The ramp door and frame assembly 100 includes a generally rectangular ramp door 200 that can pivot about an axis 150 relative to a generally rectangular frame assembly 300 between a closed position shown in FIG. 1 and open positions, a typical one of which is shown in FIG. 2. The frame assembly 300 is intended to form a portion of a cargo container or a truck, trailer or other vehicle (not shown) having a cargo compartment opening 125 (see FIG. 2) through which cargo, goods and/or smaller vehicles such as motorcycles, snowmobiles, all-terrain vehicles and the like can be loaded into an associated cargo compartment for transport.

The ramp door 200 has an interior surface 202 made up largely of a stiff interior sheet 230, a stiff exterior surface 204 made up largely of an exterior sheet 235, a top end region defined by a top extrusion 246, a bottom end region defined by a bottom extrusion 248, and opposed left and right side regions defined by side extrusions 242 and 244, and pivots about an axis 150. Referring to FIG. 2, the frame assembly 300 has a top or header member 316 that extends between and connects upper end regions of a pair of opposed left and right uprights or upright members 312 and 314, and has a bottom member 318.

When in the open position shown in FIG. 2, the ramp door 200 may serve as a walk-on and/or drive-on ramp that can be used to load and offload cargo and small vehicles through the cargo compartment access opening 125 that is surrounded by the elements 312, 314, 316, 318 of the frame assembly 300. The opening 125 is at least partially closed by the ramp door 200 when the ramp door 200 is in a closed position (the ramp door 200 depicted in FIG. 1 fully closes the opening 125 when in the closed position).

To aid one in moving the ramp door 200 between the open and closed positions, handles 105 are provided at a convenient height on opposite side regions of the exterior surface 204 of the ramp door 200 as is best seen in FIG. 1; and, as is best seen in FIG. 2, a pair of tensioned lift cables 410 connect with opposite side regions of the ramp door 200 at locations spaced equidistantly from the pivot axis 150. The lift cables 410 are components of a tensioned cable door closure system 400 (see FIG. 4), other elements of which will be described later herein. The tensioned lift cable system 400 is one of a variety of types of door closure systems that can be used to assist pivotal movement of the ramp door 200.

To cushion the engagement of the ramp door 200 with a ground surface or with pavement (not shown) when the ramp door 200 is in a ramp-down open position such as is depicted in FIG. 2, a plurality of resilient bumper pads, indicated by the numeral 115 in FIG. 1, are mounted on the exterior surface 204 of the ramp door 200. The bumper pads 115 may take any of a variety of commercially available forms, and may be replaced by one or more elongate resilient members (not shown) that provide greater ground or pavement engaging surface area and/or are thicker than the bumper pads 115 that are depicted in FIG. 1.

Figure 8:
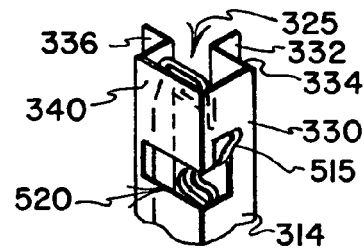
FIG. 8 is a perspective view on an enlarged scale showing another portion of the right upright at a location where a latch assembly is mounted.
Figure 25:
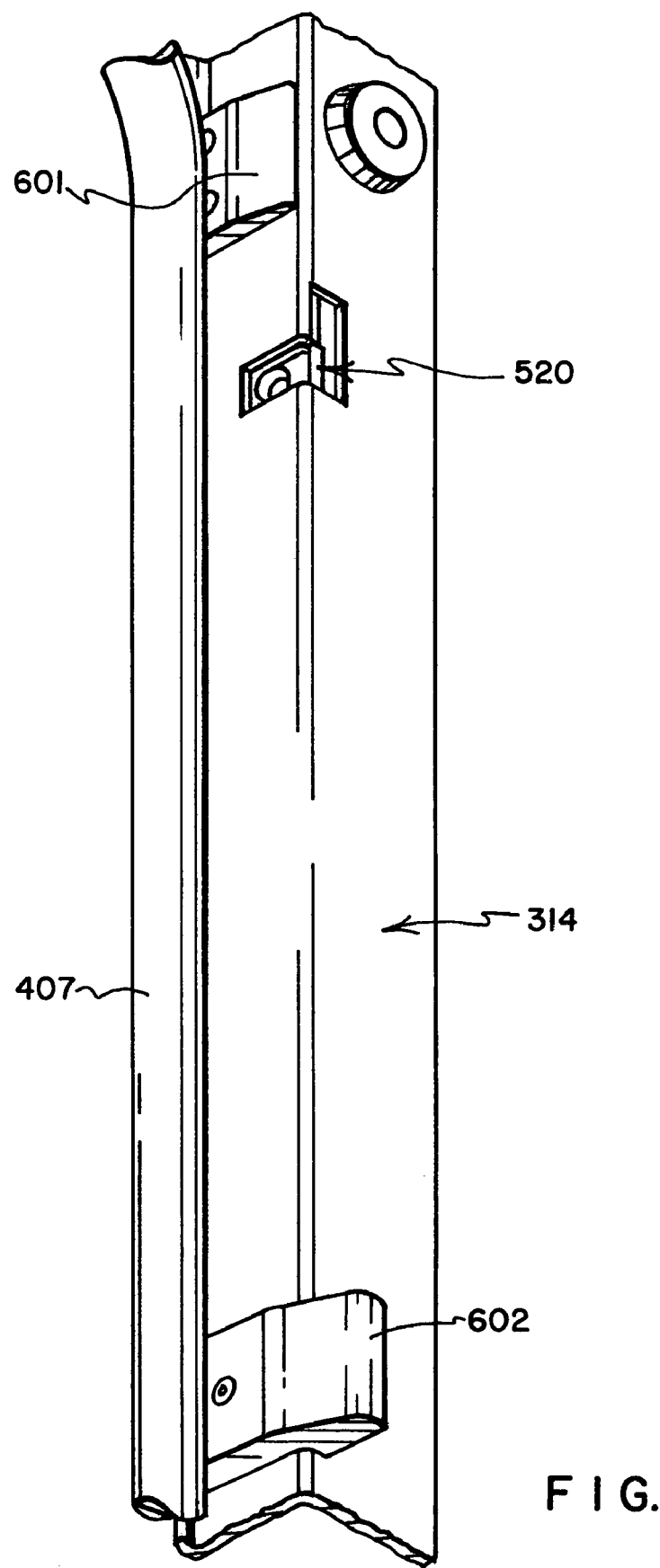
FIG. 25 is a perspective view on an enlarged scale of an interior portion of one of the frame assembly uprights showing optional guide components that may be mounted thereon to assist in guiding the ramp door toward its closed position; and, FIG. 26 is a schematic depiction showing how one of two identically arranged lift cables may have its opposite ends connected to a side of a ramp door, with a central region of the lift cable being reeved around a spring-supported pulley that tensions the lift cable to bias the ramp door toward its closed position.

To releasably retain the ramp door 200 in the closed position of FIG. 1, a pair of strikes 510 (one of which is more clearly depicted in FIGS. 20 and 23) are mounted on an upper end region of the ramp door 200, specifically on extrusions 242, 244 of the ramp door 200 at locations spaced equidistantly from the top of the ramp door 200. The ramp-door-carried strikes 510 are configured to be latchingly engaged by a pair of slam latch mechanisms 520 (one of which is more clearly depicted in FIGS. 20 and 23) carried on opposite sides of the frame assembly 300 (actually carried within hollow upper end regions of the door frame upright members 312, 214, as is depicted in FIGS. 8 and 25).

Figure 4:
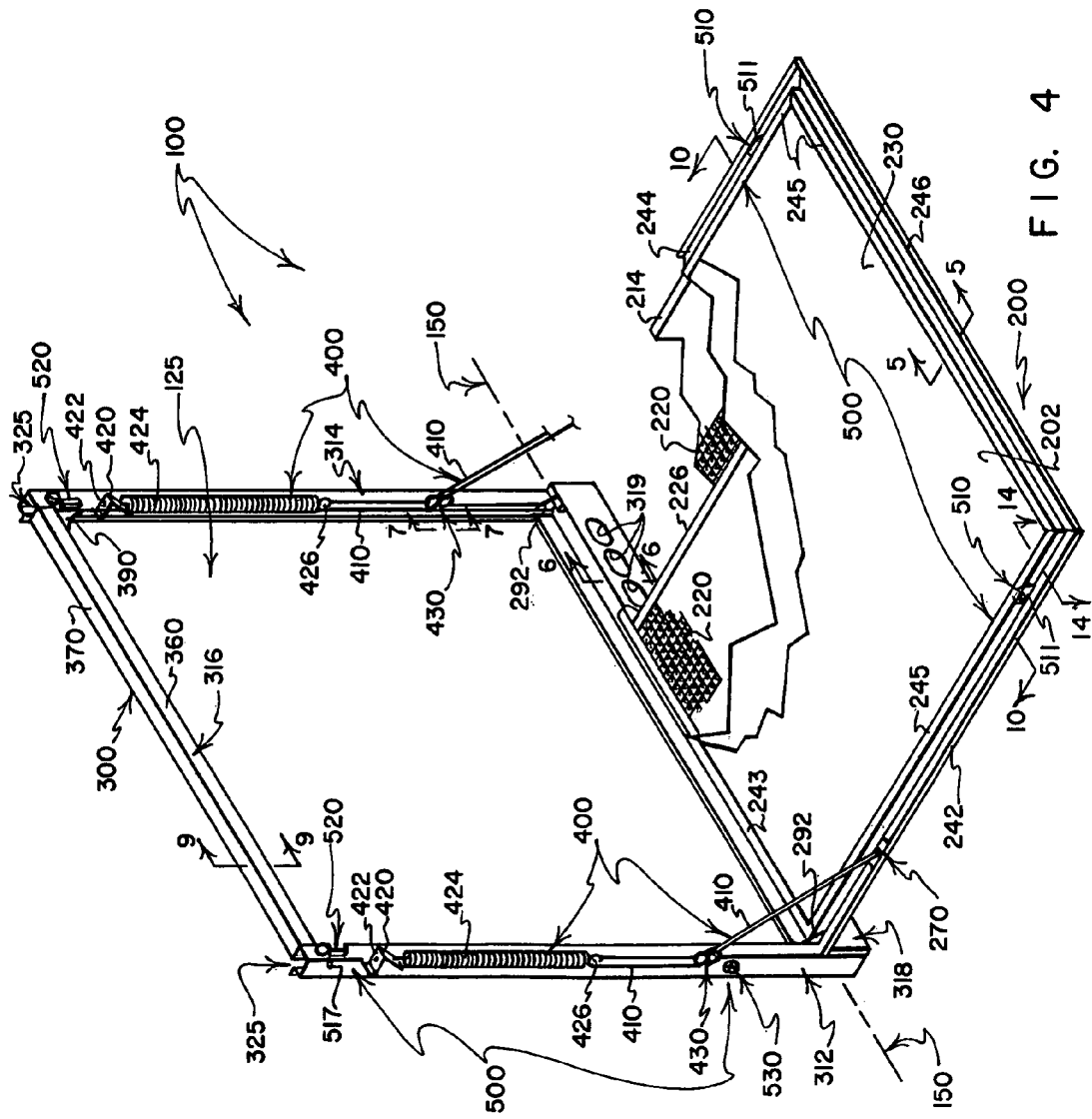
FIG. 4 is a somewhat schematic perspective view with the ramp door open, with portions of the ramp door broken away to permit underlying structure to be seen, and with normally hidden elements housed within the uprights of the frame assembly shown as though the uprights are transparent.
Figure 5:
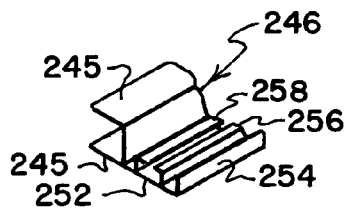
FIG. 5 is a perspective view on an enlarged scale showing the profile of an extrusion utilized to form peripheral portions of the ramp door, as seen from a plane indicated by a line 5-5 in FIG. 4.

The strikes 510 and the latch mechanisms 520 are elements of a latching system 500 (see FIG. 4) that will be described later herein. Among other elements of the latching system 500 are identical left and right push button actuator mechanisms 530 (one of which is shown in FIG. 1, the other of which is shown in FIG. 4, with one of the identical mechanisms 530 being more clearly illustrated in FIG. 24) that are carried by left and right upright members 312, 314 of the frame assembly 300. The actuator mechanisms 530 have push buttons 550 which, when depressed while unlocked, cause latch release cables 540 (that each connect one of the push button actuator mechanisms 530 to an associated one of the latch mechanisms 520) to be tensioned to operate the latch mechanisms 520, causing the latch mechanisms 520 to release their engagement with the ramp-door-carried strikes 510 so the ramp door 200 can pivot about the axis 150 away from the closed position of FIG. 1 toward the open position of FIG. 2.

Figure 3:
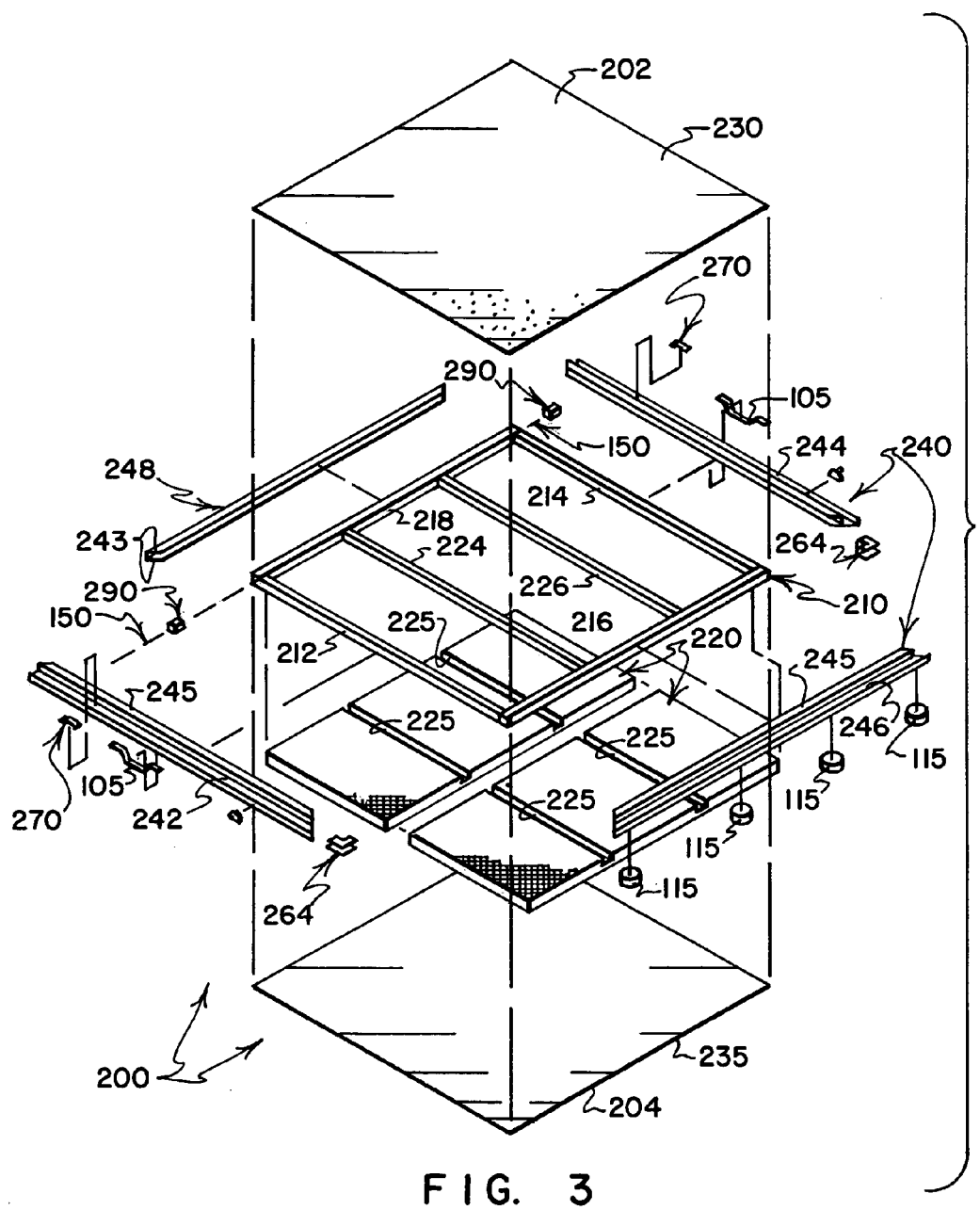
FIG. 3 is an exploded perspective view showing selected components of the ramp door.

Referring to FIG. 3, the very sizable ramp door 200 needs to provide substantial strength and a high degree of resistance to bending and deflection while still being very light in weight. To meet these requirements, the ramp door 200 has an inner skeleton 210 formed as a welded assembly of tubular aluminum extrusions and a pair of stiff, crush resistant honeycomb panels 220 that are sandwiched between and bonded to the interior panel 230 and the exterior panel 235. An outer structure 240 is formed from the aluminum extrusions 242, 244, 246, 248 connected by fasteners to enable the outer structure 240 to extend about the skeleton 210 and to interconnect overlying peripheral portions or edge regions of the panels 230, 235.

The inner skeleton 210 has opposed side elements 212, 214, upper end regions of which are connected by an upper element 216, and lower end regions of which are connected by a lower element 218. The elements 212, 214, 216, 218 are of substantially equal thickness and are engaged by inner surfaces of the interior and exterior panels 230, 235 (see FIG. 10 wherein the side elements 212, 214 are shown sandwiched between and engaged by the panels 230, 235). The inner panel 230 defines the vast majority of the interior surface 202 of the ramp door 200. The exterior panel 235 defines the vast majority of the exterior surface 204 of the ramp door 200. When bonded to the stiff, crush resistant honeycomb panels 220, the inner and outer panels 230, 235 cooperate with the honeycomb panels 220, with the inner skeleton 210, and with the outer structure 240 to provide a rigid ramp door that will serve nicely both as a ramp and as a door.

Figure 10:
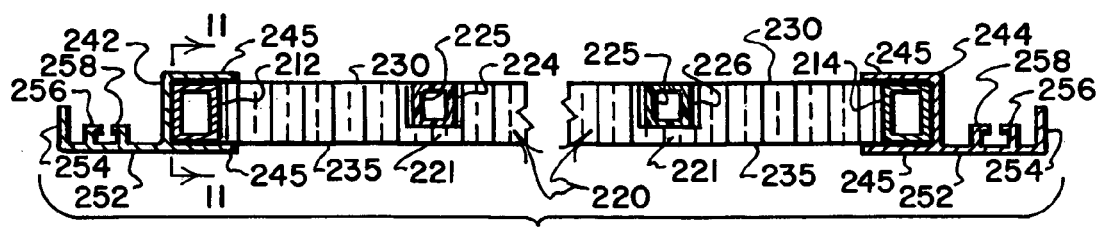
FIG. 10 is a foreshortened cross-sectional view of the ramp door as seen from a plane indicated by a line 10-10 in FIG. 4.

Referring to FIG. 3, the inner skeleton 210 also includes two additional elements 224, 226 that extend between and connect the upper and lower elements 216, 218. The additional elements 224, 226 extend parallel to the side elements 212, 214 at locations spaced between the side elements 212, 214, and are of a lesser thickness than the elements 212, 214, 216, 218. Referring to FIG. 10, the additional elements 224, 226 are seen to be engaged by the inner surface of the interior panel 230, but are separated from the exterior panel 235 by thin sections 221 of the honeycomb panels 220. In essence, the additional elements 224, 226 are received in grooves 225 (see FIG. 3) formed in the honeycomb panels 220. By utilizing the thin sections 221 of the honeycomb panels 220 (see FIG. 10) to prevent the elements 224, 226 from directly engaging the exterior panel 235, the location of the additional elements 222, 224 within the interior of the ramp door 200 is prevented from "printing through" the exterior panel 235 in a manner that might detract from the attractively smooth finish of the exterior surface 204 of the exterior panel 235 by allowing the locations of the elements 224, 226 to become visible through the exterior panel 235.

The extrusions 242, 244, 246 are of a substantially identical cross-section, as depicted variously in FIGS. 5, 10, 13 and 15-17. The identical cross-sections of the extrusions 242, 244, 246 each include a flange 252 that extends away from the area of the sandwich of the inner and outer panels 230, 235 and ultimately curves forwardly to define a forwardly extending lip 254. When the ramp door 200 is in the closed position of FIG. 1, the flange 252 extends away from the thicker central region of the ramp door 200 (i.e., away from where the inner and outer panels 230, 235 sandwich the honeycomb panels 220) to overlie rear faces of the upright and header portions 312, 314, 316 of the frame assembly 300 (see FIG. 16 wherein a typical one of the flanges 252 is shown overlying an upright 312 of the frame assembly 300).

At a location between the sandwich of the inner and outer panels 230, 235 and the lip 254, spaced L-shaped portions 256, 258 (best seen in FIGS. 13-17) extend away from but cooperate with the flange 252 to define a tee-channel 260 (see FIG. 17) that provides a mounting track for connecting the lift cables 410 and/or various other components to the ramp door 200.

Figure 14:
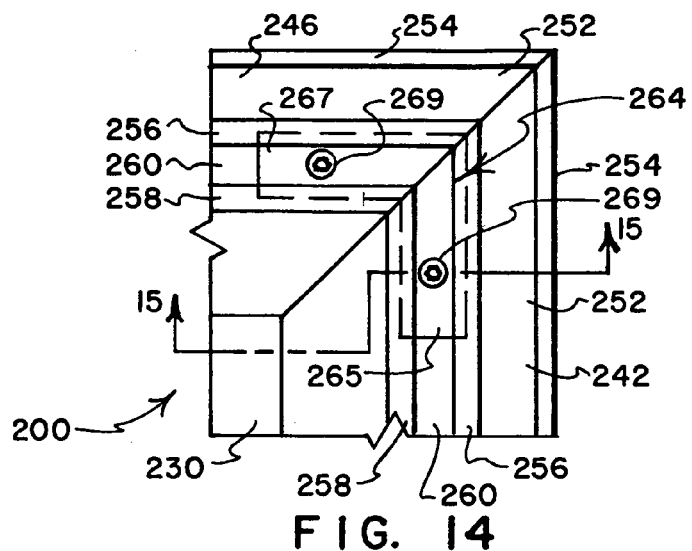
FIG. 14 is an enlargement of an upper corner region of the ramp door as seen from a direction indicated by a line 14-14 in FIG. 4.
Figure 15:
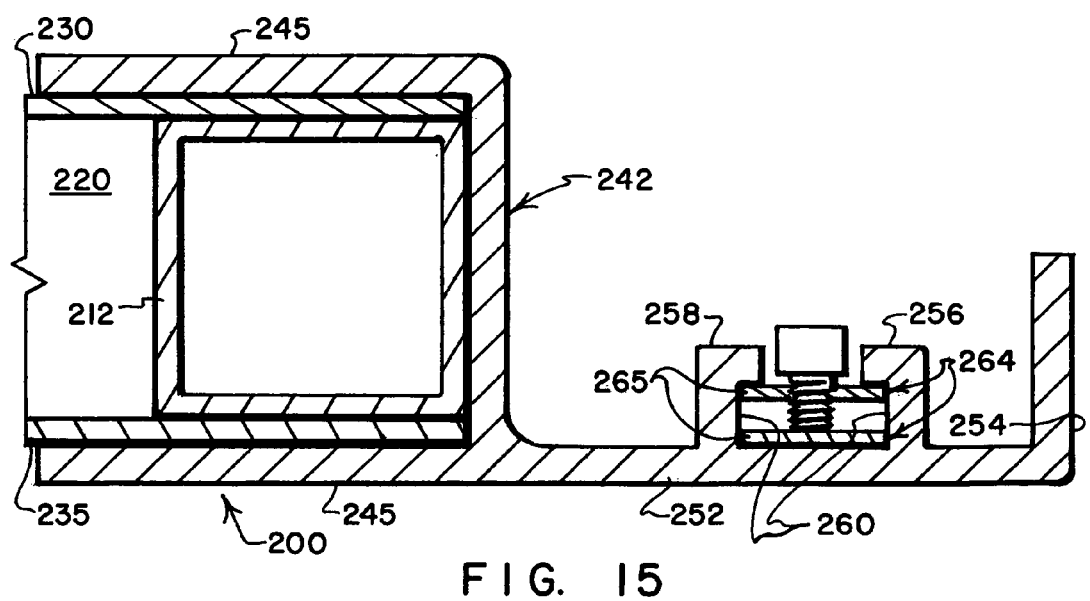
FIG. 15 is a cross-sectional view on an enlarged scale, as seen from planes indicated by a broken line 15-15 in FIG. 14.

Referring to FIG. 3, upper end regions of the side extrusions 242, 244 are connected to opposite end regions of the upper extrusion 246 by pairs of L-shaped corner connectors 264. Referring to FIG. 14 wherein one of the two upper corner portions of the ramp door 200 is shown (the upper corner portions of the ramp door 200 are identical except for being mirror images of each other), leg portions 265, 267 of the corner connectors 264 are inserted into the tee-channels 260 of adjacent ones of the extrusions 242, 244, 246. As is best seen in FIG. 15, headed fasteners 269 are threaded through holes formed through one connector of each of the connector pairs 264 and are tightened into engagement with the other connector of each of the connector pairs 264 to clamp the corner connectors 264 in place in the tee-channels 260.

Figure 18:
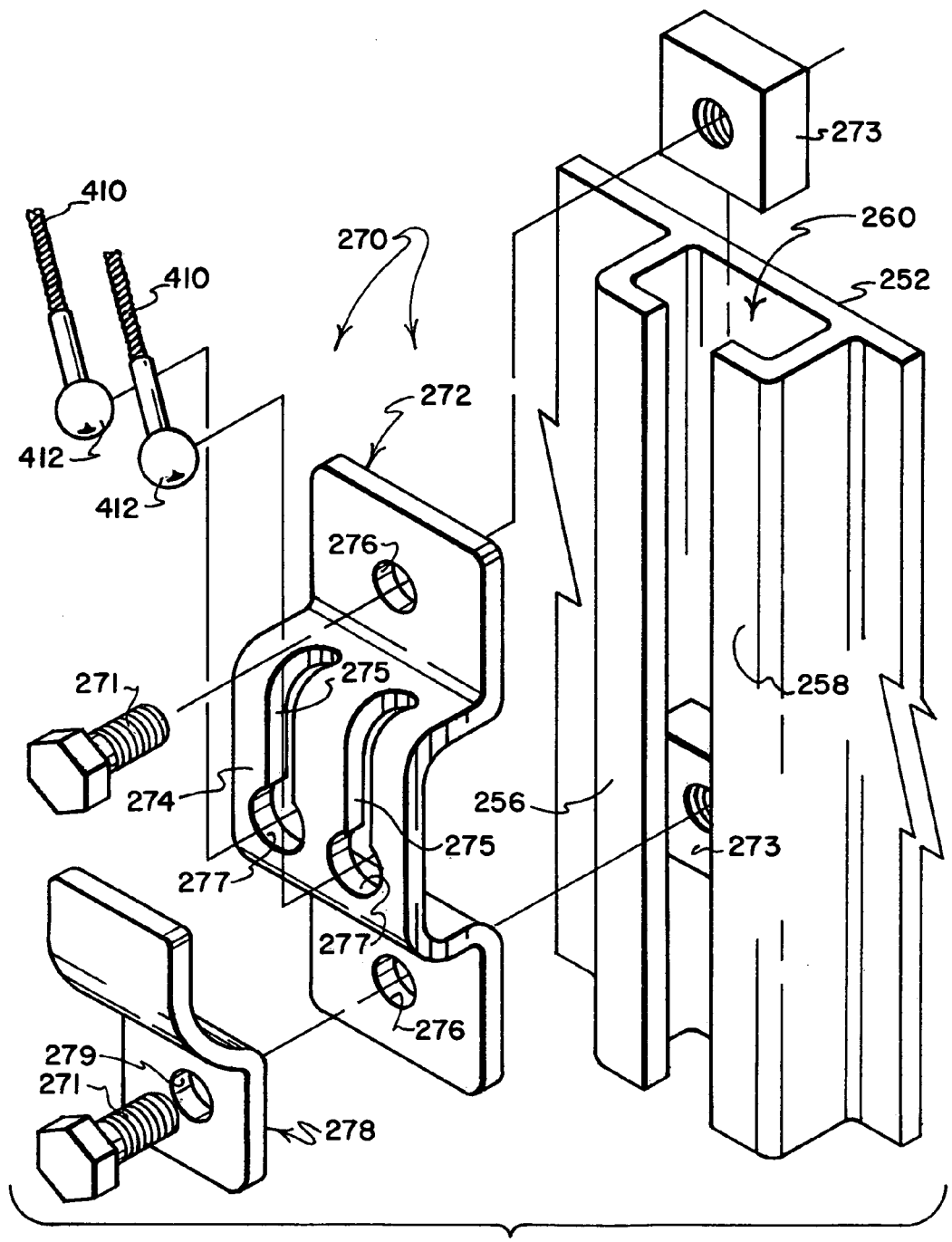
FIG. 18 is an exploded perspective view showing on an enlarged scale elements that connect end regions of a tensioned door lift cable to a side region of the ramp door.

The tee-channels 260 of the side extrusions 242, 244 of the ramp door 200 also are used to mount cable connector assemblies 270 on opposite sides of the ramp door 200—in a way that gives one side of the ramp door 200 an appearance that is identical to but a mirror image of the appearance of the other side of the ramp door 200. Referring to FIG. 18 wherein components of one of the cable connector assemblies 270 are depicted, each of the assemblies 270 includes an elongate hat-shaped bracket 272 having a crowned central region 274 that is provided with a pair of slots 275. Mounting holes 276 are formed through opposite end regions of the brackets 272. Each of the assemblies 270 also includes a curved strap 278 that is configured to cover enlarged end regions 277 of the associated slots 275 to prevent escape from the slots 275 of ball-shaped connectors 412 that are provided on end regions of an associated one of the door lift cables 410. A mounting hole 279 is formed through each of the straps 278 in the manner depicted in FIG. 18.

The straps 278 and the brackets 272 are mounted on the ramp door 200 by bolts 271 and nuts 273, examples of which are shown in FIG. 18. The bolts 271 extend through the holes 276, 279 and are threaded into the nuts 273 which are installed in the tee-channels 260. The bolts 271 are tightened into the nuts 273 to clamp the straps 278 and the brackets 272 in place at locations along opposite sides of the ramp door 200—locations that are spaced equidistantly from the pivot axis 150 of the ramp door 200.

Each of the lift cables 410 connects with a different side region of the ramp door 200, and extends from the ramp door 200 to a location along one of the upright members 312, 314 where pulley assemblies 430 are provided adjacent openings formed through the upright members 312, 314. In a manner depicted schematically in FIG. 26, each of the lift cables 410 has a central loop that extends upwardly through the hollow interior of one of the upright members 312, 314 and is reeved around a pulley 426 (see also FIG. 4) that is supported on the lower end region of one of the lift springs 424. By this arrangement, each of the springs 424 serves to apply tension to a different one of the lift cables 410, and this, in turn, causes the ramp door 200 to be biased toward the closed position shown in FIG. 1.

Figure 26:
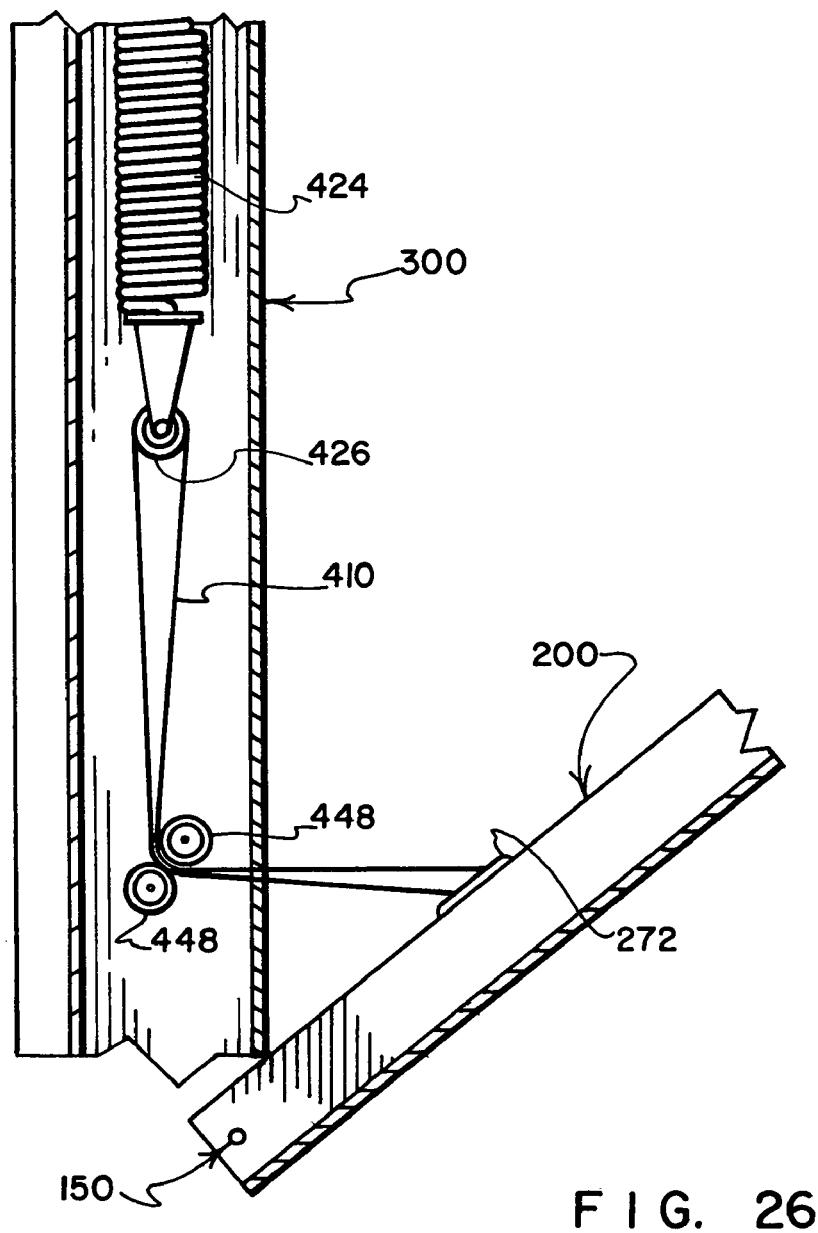

The lift assist door closure cable, spring and pulley system depicted schematically in FIG. 26 is one of many types of closure assist systems that may be used to help counterbalance the weight of the ramp door 200, and to render it possible to pivot the ramp door 200 between its open and closed positions. The prior art discloses a number of other closure assist systems that can be substituted for the arrangement schematically depicted in FIG. 26.

Figure 11:
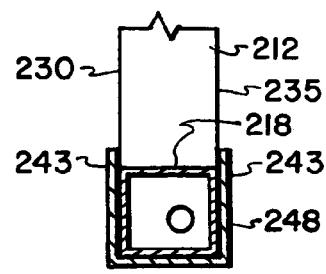
FIG. 11 is a cross-sectional view on an enlarged scale as seen from a plane indicated by a line 11-11 in FIG. 10.

Referring to FIG. 11, the bottom extrusion 248 of the ramp door 200 has a simpler cross-section than is defined by the extrusions 242, 244, 246—namely a generally U-shaped cross section having opposed legs 243 that sandwich bottom portions the interior and exterior panels 230, 235 and clamp the panels 230, 235 into engagement with the bottom element 218 of the internal skeleton 210. In a similar manner (as is depicted in an exemplary fashion in FIG. 10), the extrusions 242, 244, 246 also have U-shaped formations with opposed legs 245 that sandwich side and top regions of the interior and exterior panels 230, 235 therebetween. The opposed legs 243, 245 of the extrusions 242, 244, 246, 248 clamp perimeter portions of the interior and exterior panels 230, 235 against the tubular extrusions 212, 214, 216, 218, respectively, that form the perimeter of the interior skeleton 210 of the ramp door 200.

Adjacent end regions of the extrusions 242, 244, 246, 248 have miter-cut formations that, when fitted together to form corner regions of the ramp door 200, give the exterior face of the ramp door 200 something of a picture-framed appearance, as shown in FIG. 1. In preferred practice, the extrusions 242, 244, 246, 248 and the exterior panel 235 are painted or otherwise coated to provide an appearance similar to other exterior surfaces of a vehicle (not shown) on which the ramp door and frame assembly 100 are installed.

In preferred practice, the honeycomb panels 220 are formed from stiff, crush resistant polypropylene plastic, with each of the panels 220 providing an array of side-by-side passages, opposite ends of which open adjacent the inner surfaces of the interior and exterior panels 230, 235. In preferred practice, the honeycomb panels 220 are connected to inner surfaces of the interior and exterior panels 230, 235 as by use of a suitable adhesive, or by other suitable bonding techniques to rigidify the sandwich structure of the ramp door 200.

In preferred practice, the interior panel 230 is formed from stiff fiber reinforced plastic material having an antiskid surface or finish (which defines the vast majority of the interior surface 202 of the ramp door 200) such as is sold by Kemlite Company, Inc. of Joliet, Ill. 60434 under the registered trademark GRIPSTAR. The exterior panel 235 is formed from stiff fiber reinforced plastic material (which defines the vast majority of the exterior surface 204 of the ramp door 200) having a smooth surface that preferably matches other smooth surfaces of a vehicle (not shown) on which the assembly 100 is installed.

Figure 16:
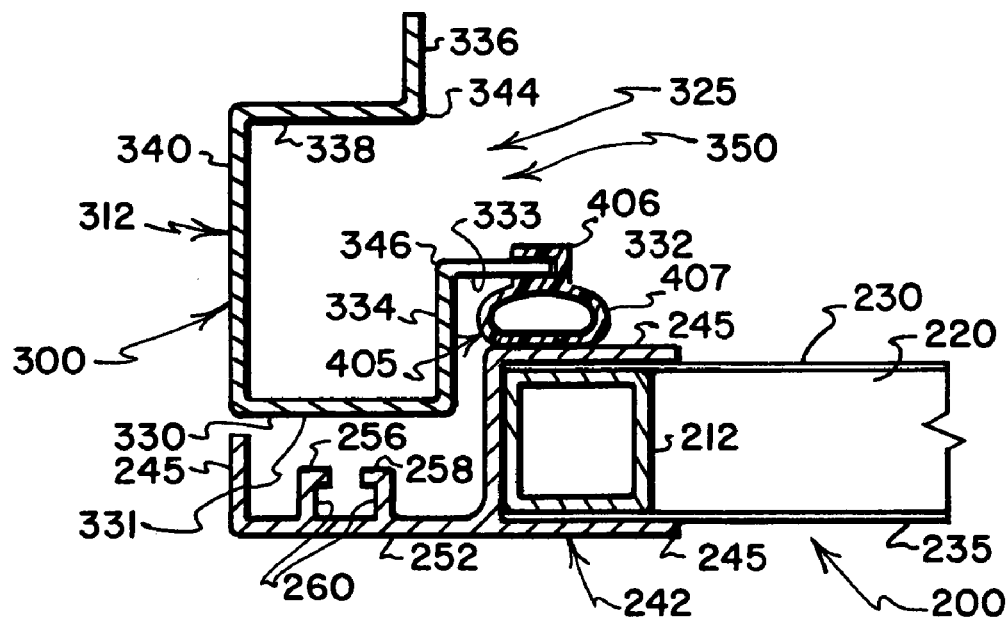
FIG. 16 is a cross-sectional view on an enlarged scale as seen from a plane indicated by a line 16-16 in FIG. 1, with the ramp door in the closed position.
Figure 17:
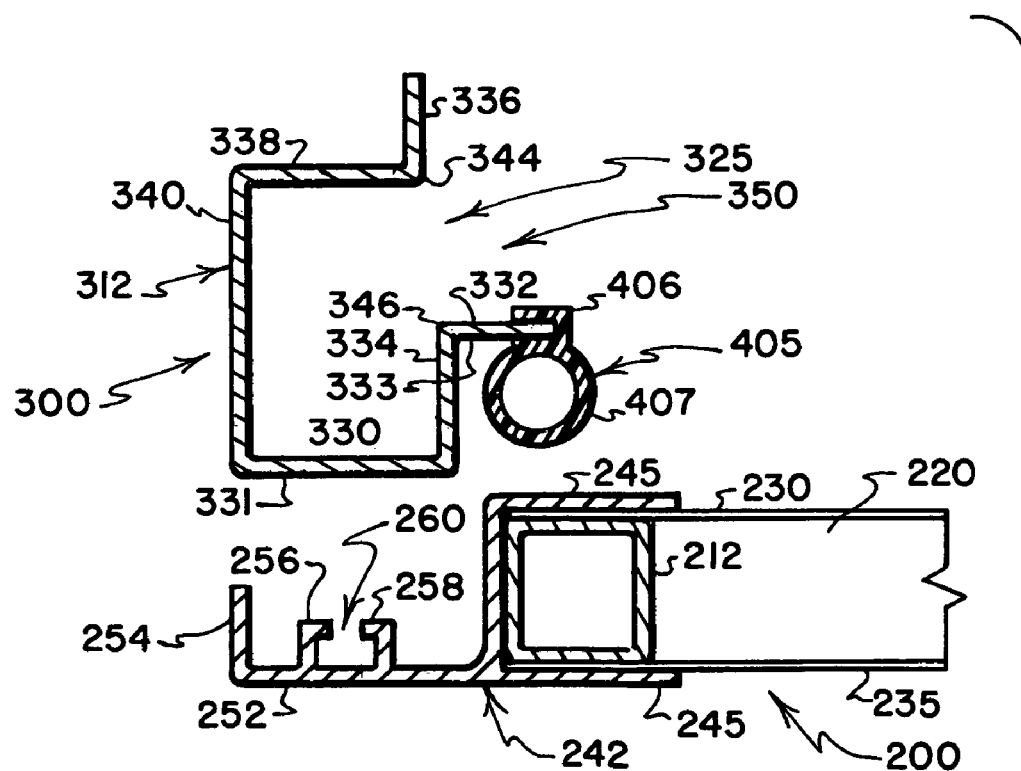
FIG. 17 is a cross-sectional view similar to FIG. 16 but with the ramp door moved to an open position to permit a door seal to resume its uncompressed form.

The upright members 312, 314, the header member 316, and the bottom member 318 of the frame assembly 300 preferably are formed as extrusions of aluminum. The upright extrusions or "uprights" 312, 314 have identical cross-sections or profiles, as depicted variously in FIGS. 7, 8, 13, 16 and 17. Referring to FIGS. 16 and 17 wherein the cross-section of a typical one of the uprights 312 is shown, it will be seen that the upright 312 (and the identical upright 314 which has a cross-section that is a mirror image of the cross-section of the upright 312) has a first transversely extending portion 330 that defines a primary rearwardly facing surface 331, and a second transversely extending portion 332 (located inboard from the first portion 330) that defines a secondary rearwardly facing surface 333. The transversely extending portions 330, 332 are connected by a primary forwardly-rearwardly extending portion 334. Two other forwardly-rearwardly extending portions 336, 340 of the upright 312 are connected by a third transversely extending portion 338. The forwardly-rearwardly extending portion 340 defines an exterior side surface of the upright 312 that connects with the primary rearwardly facing surface 330.

Surrounded by the portions 330, 334, 338 and 340 is the hollow open interior or open space 325 within which components of the door closure system 400 and the latching system 500 are protectively shielded, as will be described shortly. At a location between a corner juncture 344 of the portions 336, 338 and a corner juncture 346 of the portions 332, 334, a vertically extending opening 350 provides access to the space 325 so that components of the systems 400, 500 which are housed within the space 325 may be observed, lubricated and serviced. In preferred practice, the opening 350 is closed by one or more removable covers (not shown) that help to ensure that components housed within the space 325 do not collect dirt or debris, and do not have their operation interfered with by objects that inadvertently project through the opening 350.

Figure 9:
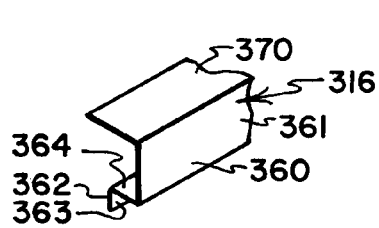
FIG. 9 is a perspective view showing on an enlarged scale the profile of an extrusion utilized to form the header of the frame assembly, as seen from a plane indicated by a line 9-9 in FIG. 4.

Referring to FIG. 9, the header extrusion 316 of the frame assembly 300 has a simpler cross-section or profile than is exhibited by the uprights 312, 314. First and second transversely extending portions 360, 362 of the header extrusion 316 define primary and secondary rearwardly facing surfaces 361, 363 that extend substantially in the same planes as the primary and secondary rearwardly facing surfaces 331, 333 of the upright extrusions 312, 314. A first forwardly-rearwardly extending portion 364 of the header extrusion 316 connects the transversely extending portions 360, 362, and a second forwardly-rearwardly extending portion 370 defines an exterior top surface of the header 316.

Figure 6:
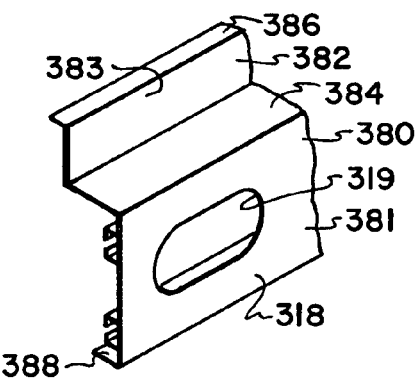
FIG. 6 is a perspective view showing on an enlarged scale the profile of an extrusion utilized to form a lower portion of the frame assembly, as seen from a plane indicated by a line 6-6 in FIG. 4.

Referring to FIG. 6, the bottom member 318 of the frame assembly 300 may provide a bumper for a vehicle (not shown) on which the ramp door and frame assembly are installed, and if desired, openings 319 may be formed through the bottom member 318 so vehicle tail lights (not shown) may be viewed therethrough. The bottom or bumper extrusion 318 has yet another cross-section or profile that is defined by first and second transversely extending portions 380, 382 which define primary and secondary rearwardly facing surfaces 381, 383. A first forwardly-rearwardly extending portion 384 connects the portions 380, 382. Second and third forwardly-rearwardly extending portions 386, 388 define top and bottom surfaces of the bottom member 318 of the frame assembly 300.

Figure 19:
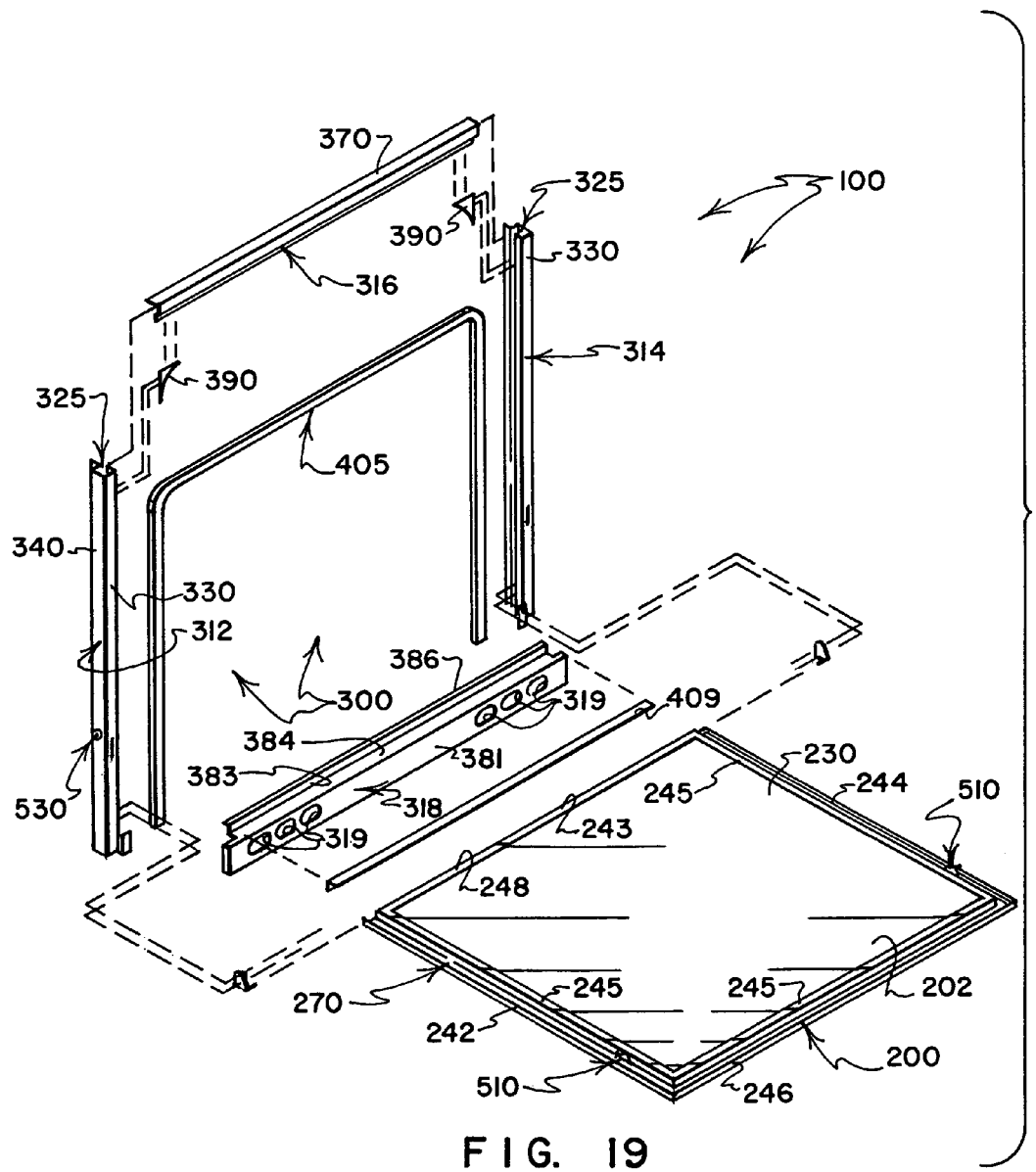
FIG. 19 is an exploded perspective view of selected elements of the ramp door and frame assembly.

To prevent dust, debris, moisture and the like from moving between the closed door 200 and the frame assembly 300, a commercially available door seal 405 is mounted on the upright portions 312, 314 and on the header portion 316, and on portions of a pair of curved gusset brackets 390 (see FIG. 19) that reinforce upper corner junctures of the frame assembly 300. Because the seal 405 extends along the secondary rearwardly facing surfaces 333, 363 of the uprights and header 312, 314, 316 at locations inboard from outer portions of the uprights and header 312, 314, 316, the seal 405 is somewhat protected by the uprights 312, 314 and by the header 316 from being inadvertently struck and damaged by cargo being moved through the door opening 125.

Figure 13:
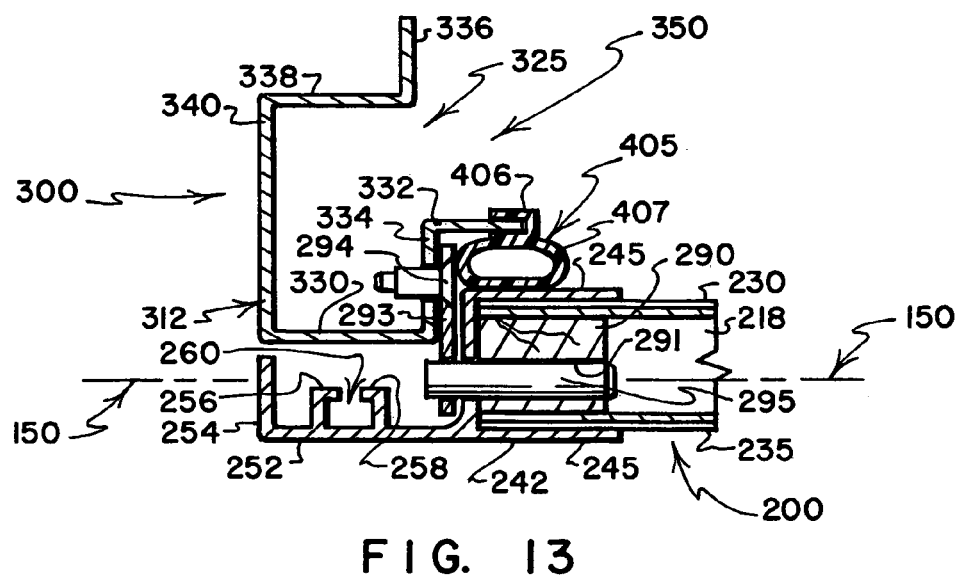
FIG. 13 is a cross-sectional view on an enlarged scale as seen from a plane indicated by a line 13-13 in FIG. 1.

The seal 405 has cross-section that includes a U-shaped portion 406 (see FIGS. 13, 16 and 17) that is installed over the edge of the portions 332, 362 of the uprights and header extrusions 312, 314, 316, and has a hollow bulbous portion 407 that normally assumes the uncompressed rounded shape that is shown in FIG. 17, but which is caused to flatten somewhat when compressively engaged by the closed door 200, as is depicted in FIGS. 13 and 16.

Also serving to prevent dust, debris, moisture and the like from moving between the closed door 200 and the frame assembly 300 is a bottom seal 409 (see FIG. 19) that is installed on the bottom member 318 of the frame assembly 300. Any of a variety of commercially available seals may be used for this purpose.

Figure 12:
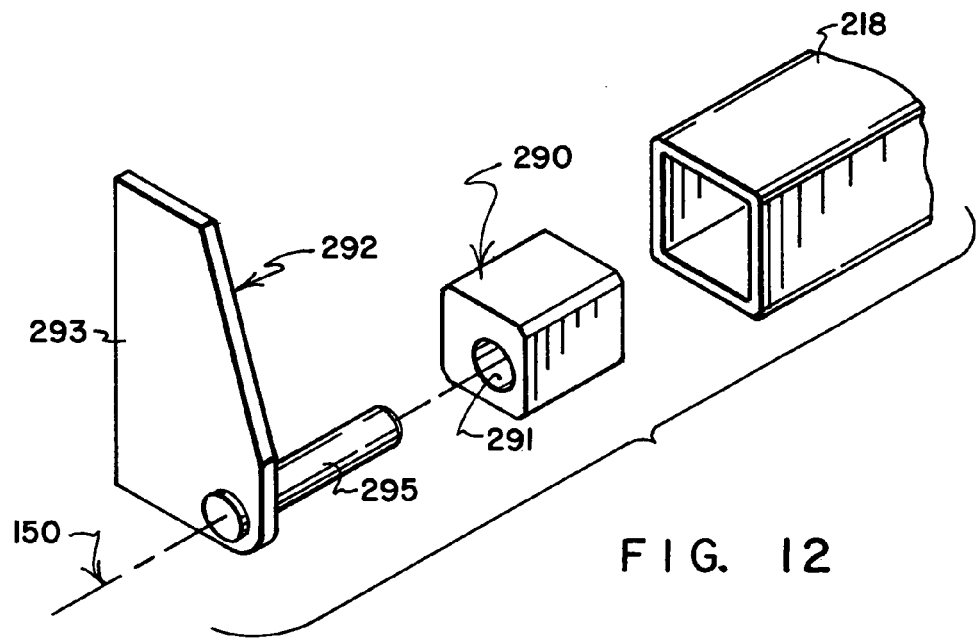
FIG. 12 is an exploded perspective view showing selected elements used to provide a pivotal connection between one side of the ramp door and the frame assembly.

To pivotally connect the ramp door 200 to the frame assembly 300 for movement about the axis 150 between door closed and door open positions, substantially identical hinge structures are interposed between lower portions of the ramp door 200 and lower portions of the door frame upright members 312, 314. Referring to FIGS. 12 and 13 wherein elements of one of these hinged connections are depicted, metal blocks 290 having offset holes 291 formed therethrough are inserted into opposite end regions of the bottom tubular member 218 of the interior skeleton 210 of the ramp door 200. Right and left hinge brackets 292 (one of which is shown in FIGS. 12 and 13) are provided, each having a plate portion 293 and a pin portion 295. The plate portion 293 is connected by one or more fasteners 294 to one of the uprights 312, 314 (one such connection is shown in FIG. 13) of the frame assembly 300. The pin portions 295 extend into the offset holes 291 of the blocks 290. The pin portions 295 are received in a slip fit within the holes 291, and extend along the axis 150 to enable the ramp door 200 to pivot relative to the frame assembly 300 about the axis 150.

Figure 7:
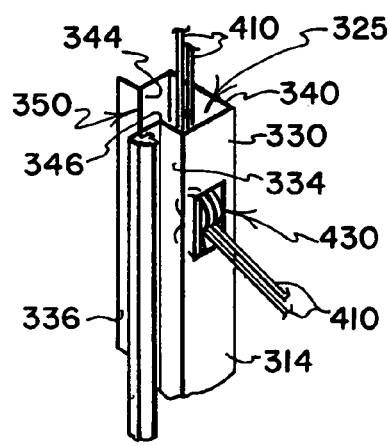
FIG. 7 is a perspective view on an enlarged scale showing a portion of the right upright of the frame assembly where a lift cable passes through an opening of the upright, as indicated by a line 7-7 in FIG. 4.
Figure 20:
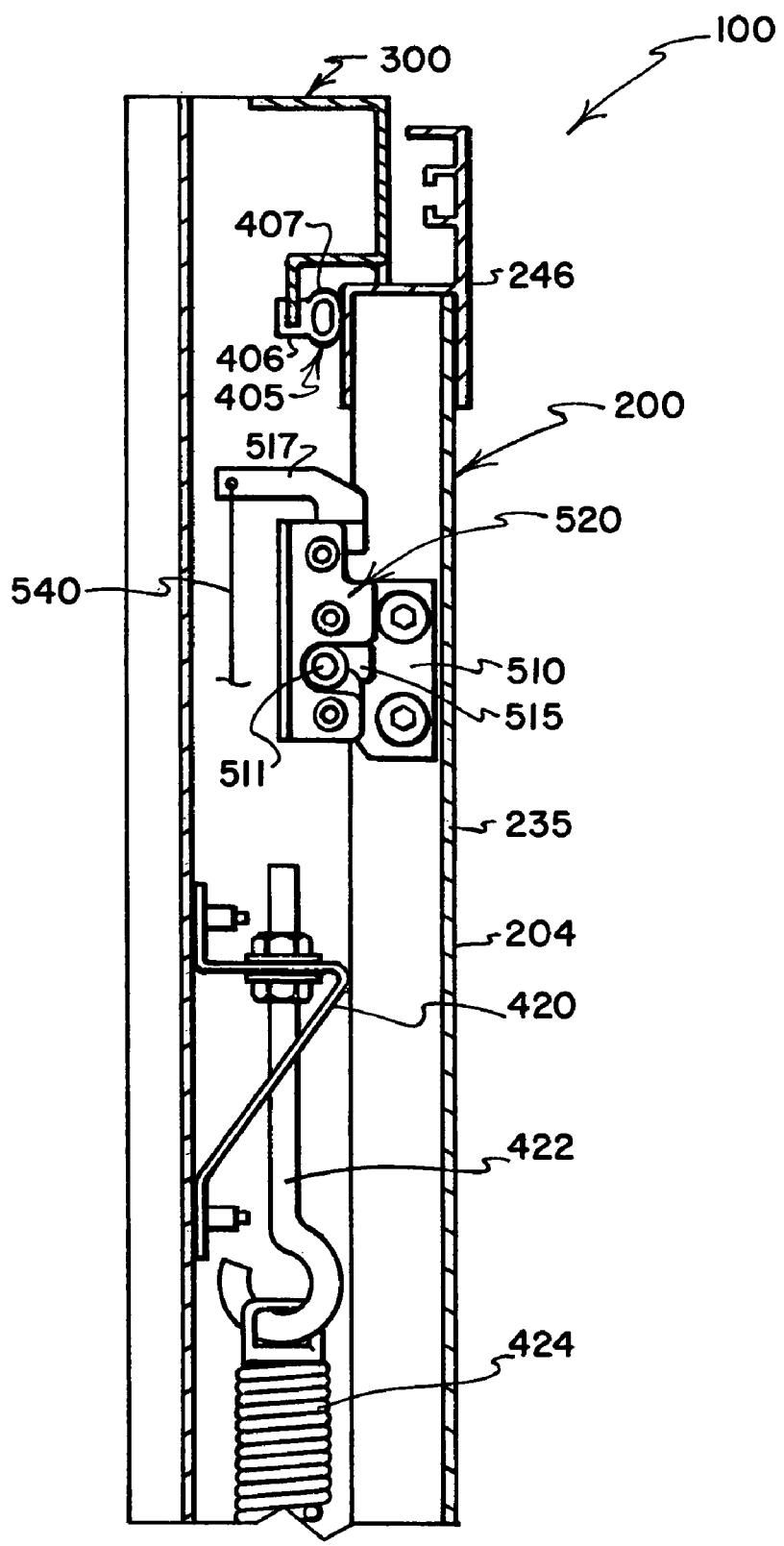
FIG. 20 is a sectional view on an enlarged scale as seen from a plane indicated by a line 20-20 in FIG. 1.
Figure 22:
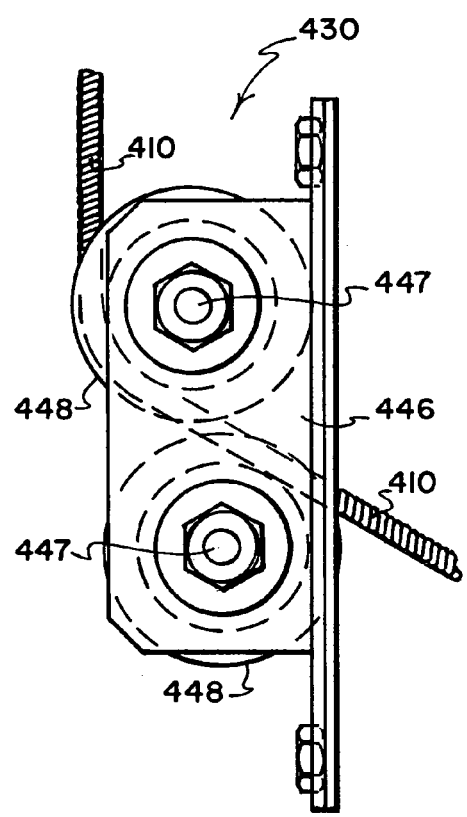
FIG. 22 is a side view thereof with cable portions added, and with portions of the pulleys shown by hidden lines.

Referring to FIGS. 4 and 20, housed within the interior space 325 of each of the uprights 312, 314 of the frame assembly 300 are elements of the door closure system 400 including a bracket 420 that supports an eyebolt 422 to which an upper end region of a tension coil spring 424 is connected. Referring to FIGS. 4, 7 and 22, also housed within the interior space 325 of each of the upright members 312, 314 is one of the previously mentioned pulley assemblies 430 which is situated adjacent where an opening is formed through the transversely extending portion 330 of the associated upright extrusions 312, 314 to permit side-by-side reaches of one of the lift cables 410 to pass from the interior space 325 to the exterior of the associated one of the uprights 312, 314 for connection to one of the two opposite sides of the ramp door 200 in the manner that has been described in conjunction FIG. 26.

The pulleys 426 (FIGS. 4 and 26) are acted on by the springs 424 that support the pulleys 426 to tension the lift cables 410. Tension force applied to the cables 410 by the springs 424 increases as the springs 424 are stretched when the ends of the lift cables 410 attached to the ramp door 200 are pulled outwardly during opening of the ramp door 200—tension that diminishes as the lift cables 410 are drawn back into the interior spaces 325 of the uprights 312, 314 during closing of the ramp door 200.

Figure 21:
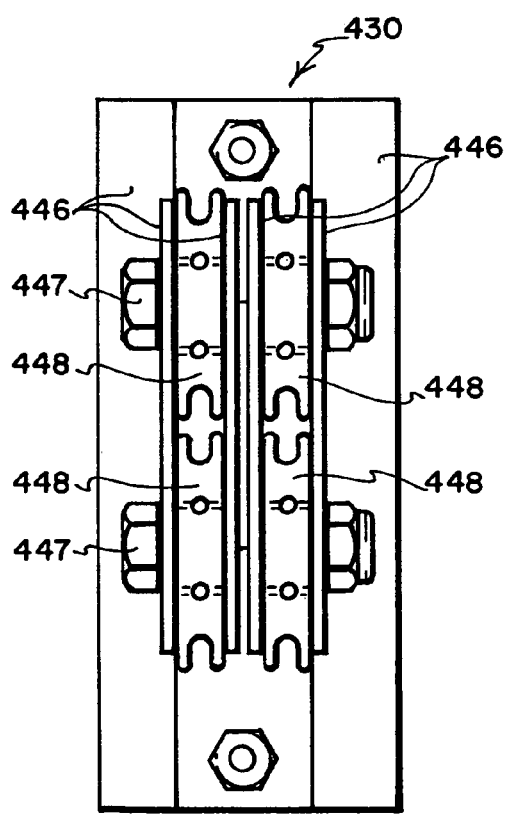
FIG. 21 is a rear view on an enlarged scale showing a typical one of two identical pulley assemblies used to guide lift cable portions through openings in the left and right uprights of the frame assembly.

Referring to FIGS. 21 and 22, the pulley assemblies 430 include brackets 446 that support bolt-like axles 447 that each mount an adjacent pair of pulleys 448 for rotation such that each one of the brackets 446 mounts a set of four of the pulleys 448. Each leg of the loop of an associated one of the lift cables 410 passes between two of the four pulleys 448 of a separate one of the pulley assemblies 430 in a manner that is depicted in FIGS. 22 and 26. In other words, each one of the lift cables 410 extends through an associated one of the pulley assemblies 430, passing between two of the four pulleys 448, then loops around an associated pulley 426 connected to an associated one of the springs 424, and then returns to and extends through the same one of the pulley assemblies 430, passing between the other two of the four pulleys 448.

Figure 23:
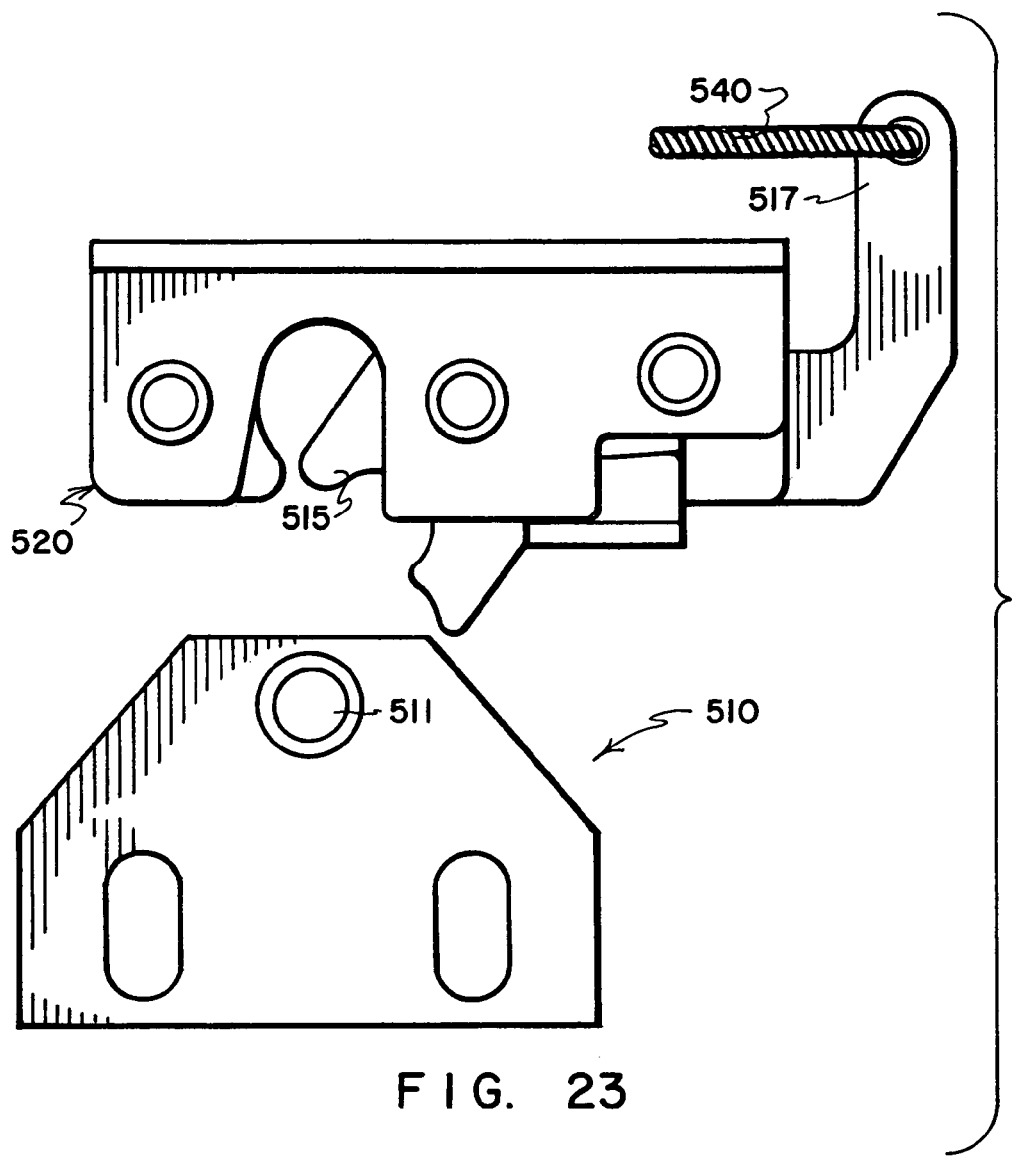
FIG. 23 a view similar to FIG. 20 but on an enlarged scale showing the slam latch and strike of FIG. 20 before these elements are brought into latched engagement.

Major elements of the latching system 500 include the ramp-door-carried strikes 510, the upright carried latches 520, the push button actuators 530, and latch release cables 540 which extend between the latches 520 and the actuators 530. Referring to FIGS. 20 and 23, as the ramp door 200 closes, transversely extending pin portions 511 of the door-carried strikes 510 move through slots formed in the uprights 312, 314 of the frame assembly 300 as the pin portions 511 move toward and ultimately are latchingly engaged by the latch assemblies 520 which are protectively housed within the interior spaces 325 of the uprights 312, 314.

Figure 24:
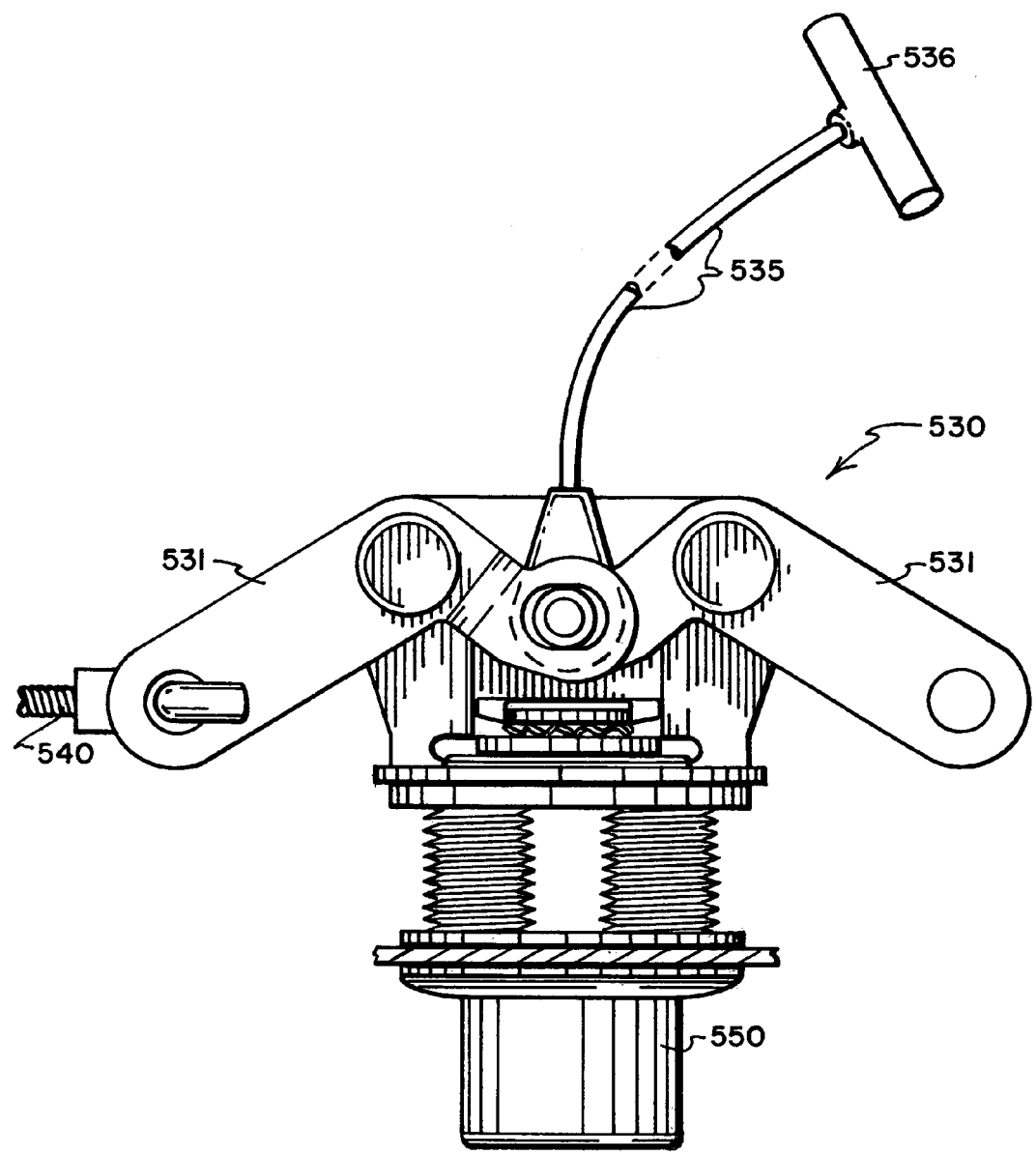
FIG. 24 is a side elevational view on an enlarged scale showing one of two push button actuator assemblies that are mounted on uprights of the frame assembly.

The latch assemblies 510 have rotary latch bolts 515 that pivot when engaged by the pin portions 511 of the strikes from a strike receiving position depicted in FIG. 23 to a strike retaining position depicted in FIG. 20 to latch the ramp door 200 closed. The latch assemblies 520 also have release arms 517 that are connected to latch release cables 540 (opposite end portions of one of the cables 540 are shown in FIGS. 23 and 24), and each of the cables 540 is connected to an operating arm 531 (see FIG. 24) of one of the push button actuator assemblies 530. When the push buttons 550 of the identical push button actuator assemblies 530 (see FIG. 24) are depressed, this causes the operating arms 531 of the assemblies 530 to pivot to tension the latch release cables 540 to, in turn, pivot the latch release arms 517 of the latches 520 to release the rotary latch bolts 515 from retainingly engaging the pin portions 511 of the strikes 510, which, in turn, permits the ramp door 200 to be pivoted away from its closed position.

The latch assemblies 510 are so-called "slam latches" of the type that are described in considerable detail in the referenced Slam Latch Patents, some of which may utilize actuator features of the type depicted in some of the referenced Push Button Actuator Design Patents, the disclosures of all of which are incorporated herein by reference. The preferred commercially available product that is selected to provide the slam latch assemblies 510 are left and right hand versions of Product No. SA25T-400 of Eberhard Manufacturing Company, Strongsville, Ohio 44149.

Referring to FIG. 24, the actuator assemblies 530 preferably each are provided with an emergency release cable 535 that has a pull-handle 536 attached thereto. In an emergency (for example if a person has been trapped inside a vehicle compartment closed by the ramp door 200), the handles 536 can be pulled to tension the cables 535 to pivot the arms 531 of the assemblies to release the latch assemblies 520 from engagement with the strikes 510 so the ramp door 200 can be opened.

The push button actuator assemblies 530 are of the type that are described in considerable detail in the referenced Push Button Actuator Patents, the disclosures of which are incorporated herein by reference. The preferred commercially available product that is selected to provide the push button actuator assemblies 530 are Product No. 2-682-PK of Eberhard Manufacturing Company, Strongsville, Ohio 44149.

Referring to FIG. 25, optional guide members such as the depicted guide blocks 601, 602 may be installed on the uprights 312, 314 of the frame assembly 300, or on other portions of the frame assembly 300 or on portions of the ramp door 200 to guide the ramp door 200 into proper engagement with the frame assembly 300 during closure of the ramp door 200. In preferred practice, such guide blocks are formed from a tough fiber reinforced plastic material that resists deformation due to repeated contact and impact.

Because the ramp door and frame assembly 100 utilizes door closure system 400 and door latching system 500 components that are protectively housed within the uprights 312, 314 of the frame assembly 300, the ramp door and frame assembly 100 has an attractive appearance both when the ramp door 200 is open and when the ramp door 200 is closed. Operating components of the systems 400, 500 are not only hidden from view and therefore do not disturb the good clean appearance of the assembly 100, but also are protectively shielded from unwanted contact—a feature that enhances safety and helps to ensure disturbance free operation.

Because the pulley assemblies 430 and the cable connector brackets 270 all are located at short, substantially equal distances from the pivot axis 150 of the ramp door 200, only short reaches of the lift cables 410 are exposed to view and to contact when the ramp door 200 is pivoted to the open position shown in FIG. 2. In preferred practice, the distance from the pivot axis 150 to the locations of the pulley assemblies 430, and the distance from the pivot axis 150 to the locations of cable connector brackets 270 (these equal distances are referred to as a length "D") is selected to be a small fraction of the total height of the ramp door 200 as measured from the pivot axis 150 to the highest point of the door extrusion 246 when the ramp door 200 is closed (referred to as a length "H").

To minimize lift cable exposure while also providing a tensioned cable door closure system 400 that provides adequate lift and counterbalance forces to enable a person of ordinary strength to easily open and close the ramp door 200, the ratio of "D" to "H" (which can be expressed as the fraction D/H) preferably resides within the range of about 0.11 to about 0.21, with the most preferred D/H ratio being approximately 0.16. Stated in another way, situating the locations where the lift cables 410 connect with the ramp door (and the locations where the lift cables 410 pass through openings into the interior spaces 325 of the uprights 312, 314) at a common distance (measured from the pivot axis) that is within the range of about 11 percent to about 21 percent of the height of the ramp door 200 (measured from the pivot axis when the ramp door 200 is closed) is found to enable lift assist components housed within the interior of the uprights 312, 314 to adequately tension the lift cables 410 to bias the ramp door 200 closed while also minimizing lift cable exposure when the ramp door 200 is open.

The various features of a ramp door, features of a door frame assembly, features of a tensioned lift cable door closure system, and features of a latching system for retaining a door in closed position that are described herein may be used separately. However, in one preferred embodiment, features of the ramp door, the door frame, the tensioned-cable door closure system and the push button operated latching system are advantageously combined to provide a lightweight, easy to open and close door of generally rectangular shape that is pivotally connected to a generally rectangular door frame—a door that is easy to open and close not only due to its lightweight construction but also due to its tensioned cable lift system which employs components shielded from contact and from view by uprights of the frame, and which utilizes aircraft quality cables that are only minimally exposed when the ramp door is open—a door that, when open, may serve as a sturdy ramp to assist the loading and unloading of cargo such as recreational vehicles and the like—a door that, when closed, is held closed by well tested, heavy duty latches that may be operated from outside the ramp door by lockable push button actuators, and from inside the vehicle by emergency releases.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended to protect whatever features of patentable novelty that exist in the invention disclosed.

What is claimed is:

1. A ramp door and frame assembly comprising:
   a) a frame assembly configured to extend about a portion of a door opening including an upright member configured to extend substantially vertically along a side region of the door opening;
   b) a ramp door pivotally connected to the frame assembly to pivot about an axis extending transverse to the upright member near a bottom region of the door opening between a closed position adjacent the upright member and an open position wherein the ramp door serves as a ramp adjacent the opening;
   c) a lift cable connected to the ramp door at a first distance from the pivot axis, and extending into the upright at a second distance from the pivot axis, wherein the first and second distances are substantially equal; and
   d) wherein the ramp door has a height measured from the pivot axis to a top edge of the ramp door when the ramp door is closed, and wherein the first distance is selected such that a ratio of the first distance to the height of the door resides within the range of about 0.11 to about 0.21 to minimize lift cable exposure when the ramp door is open.

2. The assembly of claim 1 wherein the ratio is approximately 0.16.

3. The assembly of claim 1 additionally including a tensioned cable lift system having components mounted in an interior space defined by the upright member.

4. A ramp door and frame assembly, comprising:
   a) a frame assembly configured to extend about a portion of a door opening including a hollow upright member configured to extend substantially vertically along a side region of the door opening and defining an interior space having lower and upper regions separated by a central region;
   b) a ramp door having opposed first and second end regions, with the first end region being pivotally connected to the frame assembly to pivot about an axis that extends transverse to the upright member along a bottom region of the door opening between a closed position adjacent the upright member and an open position wherein the ramp door provides a ramp adjacent the bottom region of the door opening;
   c) a strike connected to the ramp door near the second end region of the ramp door;
   d) a latch mechanism connected to the frame assembly, housed within the upper region of the interior space, and configured to latchingly engage the strike when the ramp door is in the closed position;
   e) a door lift cable connected to the ramp door at a location between the opposed first and second end regions, and extending into the lower region of the interior space; and
   f) a tensioning mechanism connected to the frame assembly, housed within the central region of the interior space and configured to tension the door lift cable to bias the ramp door toward the closed position.

5. The ramp door and frame assembly of claim 4 further comprising a latch operating mechanism connected to the frame assembly and operable to tension a latch release cable connected to the latch mechanism to cause the latch mechanism to release the strike.

6. The ramp door and frame assembly of claim 5 wherein the latch operating mechanism is at least partially housed within the lower end region of the interior space.

7. The ramp door and frame assembly of claim 5 wherein the latch operating mechanism has a push button that can be depressed to tension the latch release cable.

8. The ramp door and frame assembly of claim 7 wherein the push button is lockable to selectively permit and prevent depression of the push button.

9. The ramp door and frame assembly of claim 4 wherein the ramp door is comprised of a stiff inner sheet defining a central region of the interior face of the ramp door, a stiff outer sheet of substantially the same shape as the inner sheet defining a central region of the exterior face of the ramp door, a stiff, crush resistant honeycomb core sandwiched between the inner sheet and the outer sheet, and opposed side elements connecting the inner sheet to the outer sheet.

10. The ramp door and frame assembly of claim 9 wherein the opposed side elements each have a substantially C-shaped cross-section that sandwiches overlying edge regions of the inner and outer sheets.

11. The ramp door and frame assembly of claim 9 wherein the ramp door has at least one skeleton member extending between the opposed side elements and carried within a groove defined by the honeycomb core, wherein the at least one skeleton member is separated from the outer sheet by a portion of the honeycomb core.

12. The ramp door and frame assembly of claim 4 wherein the upright member is provided with an opening into which the strike extends when the strike is latchingly engaged by the latch mechanism.

13. The ramp door and frame assembly of claim 5 wherein the door opening provides access to the interior of a vehicle, wherein the upright member comprises a portion of the structure of the vehicle, and wherein a selected one of the latch mechanism and the latch operating mechanism is provided with an emergency pull handle that can be grasped and moved from within the interior of the vehicle to cause the latch mechanism to release the strike.

* * * * *